Patented Dec. 28, 1943

2,337,572

UNITED STATES PATENT OFFICE 2,337,572

MEDICINAL COMPOUND

Sol Roy Rosenthal, Chicago, Ill.

No Drawing. Application June 14, 1939,
Serial No. 279,054

2 Claims. (Cl. 167—52)

The present invention relates to medicinal compounds for use in the medical art. More specifically the present invention is directed to anesthetics, analgesics and anti-hemoconcentrants characterized by the presence of the phenoxy-alkyl-amine group.

While engaged in a research investigation relating to chemical mediators for pain, I discovered that the phenoxy-alkyl-amines, particularly the alkyl substituted phenoxy-alkyl di-alkyl amines possessed unique anesthetic and analgesic properties. I also discovered that the compounds in addition to their anesthetic and like properties, possessed certain properties of aid in preventing hemoconcentration, i. e. act as anti-hemiconcentrants.

The preferred compounds falling within the scope of the present invention may be represented by the following formula:

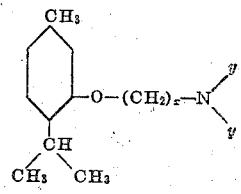

in which $x$ represents a whole number from 1 to 6 and $y$ represents lower alkyl groups containing 1 to 5 carbon atoms. When $x$ is 1 the compound is a thymoxymethyl dialkyl-amine, when $x$ is 2 the compound is a thymoxyethyl dialkylamine, when $x$ is 3 the compound is a thymoxypropyl dialkylamine, when $x$ is 4 the compound is a thymoxybutyl dialkylamine, etc. Similarly when $x$ is 2 and $y$ is a lower alkyl group containing 4 carbon atoms the compound is a thymoxyethyl dibutylamine.

It will be understood that the present invention is not limited to the preferred compounds illustrated above. Other anesthetic, analgesic or anti-hemoconcentrant phenoxy - alkyl - amines such as carvacroxy-alkyl-diethylamine, dimethyl-phenoxy-alkyl-amine, as well as other alkyl, hydroxy and halide substituted phenoxy-alkyl-alkylamines are included within the broad scope of the present invention. My investigations, however, indicate that the most potent compounds are characterized by the presence of the "thymoxy" group in which the oxygen (O) atom is at the 3 position. My investigations also indicate that thymoxy-ethyl dialkylamine and particularly the diethylamine to be preferred. The following example of the preparation of the preferred compound will serve for illustrative purposes.

EXAMPLE

PREPARATION OF THYMOXYETHYL BROMIDE

To a refluxing solution of 508 grams of thymol and 800 grams of ethylene dibromide in 800 cc. of ethyl alcohol, is added, with good agitation, over a one hour period, about 152 grams of sodium hydroxide dissolved in 400 cc. of water. The refluxing and agitation are continued for a period of approximately ten hours. The color which develops in the reaction mixture during the addition of the alkali gradually disappears during the refluxing or heating period.

When the reaction is complete the reaction mixture is concentrated in vacuo until all of the acohol is removed. The residue is next washed with dilute alkali, dissolved in benzene and the latter solution washed with water. The benzene solution is then dried over anhydrous sodium sulfate, concentrated in vacuo and the residue (solvent-free) subjected to vacuum distillation. Three fractions are ordinarily obtained by this first distillation, namely (1) recovered thymol, (2) thymoxyethyl bromide and (3) a high boiling residue. Fraction (2)—the middle fraction containing practically all of the desired thymoxy alkyl halide, is then subjected to distillation through a podbielniak column in the usual manner. Substantially pure thymoxyethyl bromide is obtained at 147°–149° C. at 10 mm. pressure.

PREPARATION OF THYMOXYETHYL-DIETHYLAMINE

Method A

About 25.6 grams of thymoxyethyl bromide (prepared for example as above described) is placed in a pressure bomb with 22 grams (3 mole ratio) of diethyl-amine and 50 ccs. of dry benzene. The sealed container (bomb) is then heated for about 8 hours under approximately 20 pounds pressure in an oil bath at 115° C.

After the reaction is complete the reaction mixture is treated with an excess of strong sodium hydroxide solution and the free base extracted with benzene. The benzene extract is then dried and concentrated in the usual manner and the residue distilled in vacuum. Substantially pure thymoxyethyl-diethylamine is obtained at 130°–131° C. at 4 mm. pressure.

Method B

About 84 grams of thymoxyethyl bromide (prepared, for example, as above described) is heated with 73 grams (3 mole ratio) of diethylamine for about 8 hours at 110° C. Diethylamine hydrobromide separates after a few hours heating. After the reaction is completed the free base i. e. thymoxyethyl-diethylamine, may be obtained by treatment with alkali hydroxide, benzene extraction and distillation at reduced pressure, as described in Method A.

PREPARATION OF THYMOXYETHYL-DIETHYLAMINE-HYDROCHLORIDE

About 60 grams of thymoxyethyl-diethylamine (prepared, for example, by Methods A or B described above) is first dissolved in a mixture made up of about 200 cc. of ethyl acetate and 600 cc. of pentane. The solution obtained is then saturated in the cold with dry hydrogen chloride. (It is important to be certain that sufficient acid has been added, or otherwise some free base may be carried down with the hydrochloride salt.) The mixture is allowed to stand overnight at 0–5° C. The thymoxyethyl-diethylamine-hydrochloride precipitate is next separated from the solvent by filtration and dried in the usual manner. This product melts at about 130.5°–132° C. On crystallization from ethyl acetate a substantially pure salt is obtained as colorless flakes melting at 131°–132° C. The salts obtained by this process without further purification (e. g. recrystallization) are preferred for purposes of the present invention.

It will be understood that the above example is merely illustrative. In a similar manner other derivatives may be prepared by reacting the proper alkyl dihalide with thymol to form the desired thymoxy alkyl halide which in turn may be reacted with the proper alkyl amine to form the desired thymoxyalkyl-alkylamine. Other phenoxy-alkylamines may be prepared in a like manner. Similarly, other salts such as the hydrobromide, hydrophosphate, hydrosulphate, etc. may also be prepared by reacting the free base with the proper acid. For administration purposes (e. g. 0.5 percent in a sterile aqueous medium) the soluble salts are ordinarily employed. In this connection it will be understood that the claims to the free base are intended to cover the base when used as such or in salt form, etc.

The compounds of the present invention may be used locally or generally and may be applied topically or administered enterally (e. g. 50–100 mg./kg.) or parentally (e. g. 20–40 mg./kg.). When injected subcutaneously or administered rectally, pain responses to pinching, pricking, cutting, etc., are abolished and hemoconcentration is prevented. The somatic sensory nerve trunks, however, remain unaffected. The compounds of the present invention when administered enterally in small amounts, e. g. 5–10 mg./kg., act to diminish pain, i. e. act as an analgesic.

It will be understood that the present invention is not limited to the representative examples herein disclosed. All modifications falling within the doctrine of equivalents are intended to be covered by the claims annexed hereto.

I claim:

1. A medicinal characterized by anesthetic, analgesic and anti-hemoconcentrant properties, thymoxyethyl-diethylamine-hydrochloride.

2. A medicinal characterized by anesthetic, analgesic and anti-hemoconcentrant properties selected from the group of compounds consisting of the base thymoxyethyl-diethylamine and acid salts thereof.

SOL ROY ROSENTHAL.